United States Patent [19]

Weiss

[11] 3,877,959
[45] Apr. 15, 1975

[54] METHOD OF FABRICATING SEAMING TAPE

[76] Inventor: Sigmond Weiss, 1330 N. Gardner, Apt. No. 109, Hollywood, Calif.

[22] Filed: June 1, 1970

[21] Appl. No.: 42,376

Related U.S. Application Data

[63] Continuation-in-part of Ser. No. 833,074, June 13, 1969, abandoned.

[52] U.S. Cl. ............... 427/172; 427/207; 427/278; 428/156; 428/343
[51] Int. Cl. ............................................ B44c 1/02
[58] Field of Search ...... 117/8, 10, 11, 64 C, 119.2, 117/111 F, 102 L; 118/101, 202

[56] References Cited
UNITED STATES PATENTS

| | | | |
|---|---|---|---|
| 2,334,102 | 11/1943 | Kauppi et al. .................. | 118/110 X |
| 2,464,771 | 3/1949 | Van Guelpen .................. | 118/410 X |
| 3,110,608 | 11/1963 | Brunson et al. ................. | 117/10 |
| 3,400,038 | 9/1968 | Burgess .......................... | 161/50 |
| 3,485,704 | 12/1969 | Clymin ............................ | 161/51 |
| 3,542,617 | 11/1970 | Watson ........................... | 161/406 X |
| 3,553,065 | 1/1971 | Stumpf et al. .................. | 161/406 X |

Primary Examiner—Marion E. McCamish
Attorney, Agent, or Firm—Thomas H. Jones

[57] ABSTRACT

A backing strip and a loosely woven strip of joining fabric positioned thereon travel under tension through an application zone where a layer of hot-melt adhesive is applied by extrusion and then the tensioned strips with the adhesive layer thereon passes around two chilled rolls to harden the adhesive. The first chilled roll hardens an inner zone of the adhesive layer and subsequently recesses in a second chilled roll to either form longitudinal ribs or form rows of projections in the remainder of the adhesive layer.

3 Claims, 17 Drawing Figures

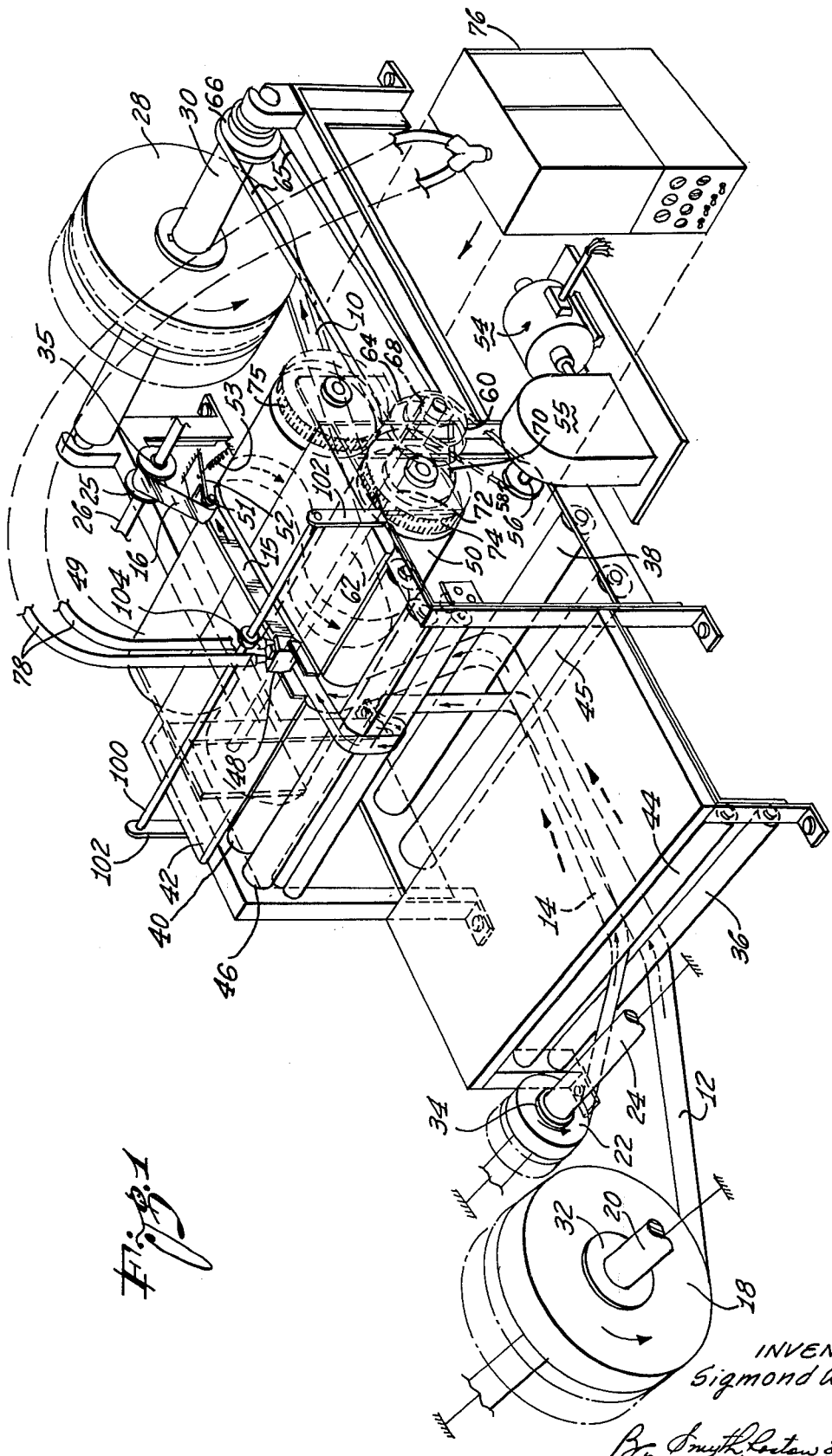

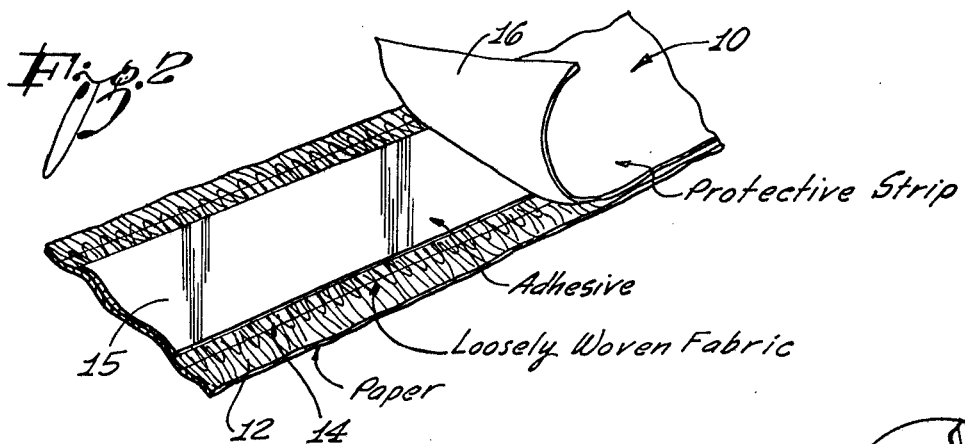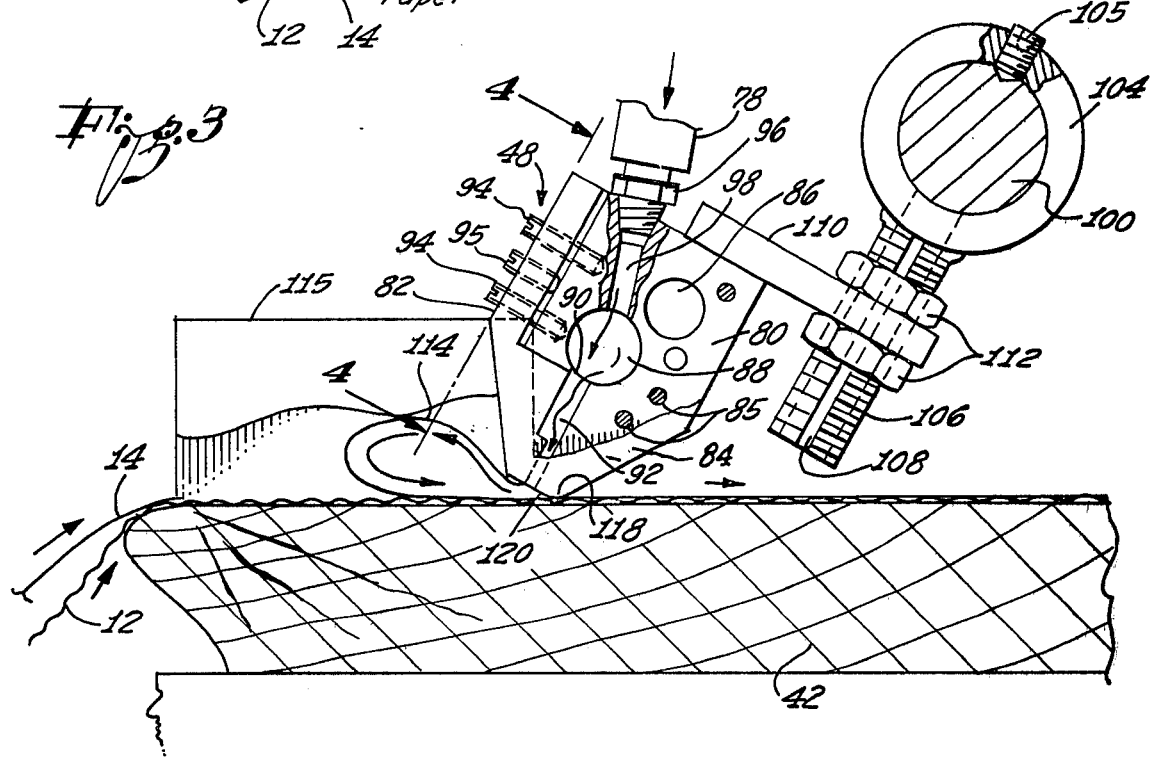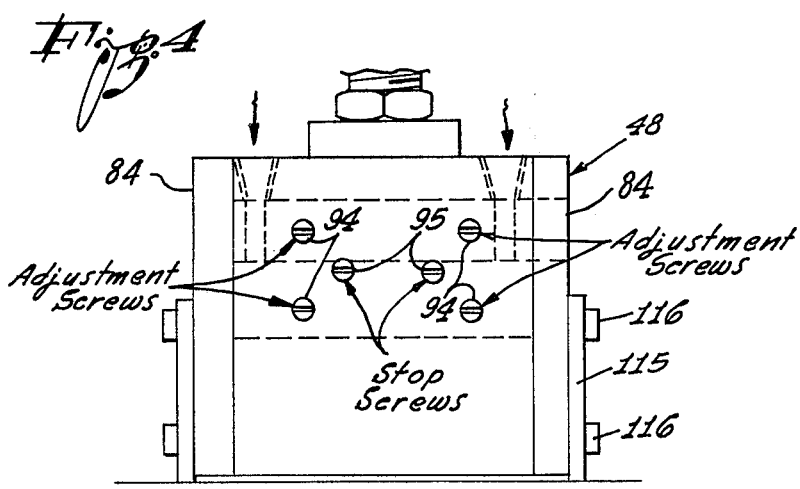

METHOD OF FABRICATING SEAMING TAPE

CROSS-REFERENCES TO RELATED APPLICATIONS

This application is a continuation-in-part of my co-pending application entitled "METHOD OF FABRICATING SEAMING TAPE," Ser. No. 833,074, filed June 13, 1969 now abandoned.

BACKGROUND OF THE INVENTION

The invention is directed to an improved method of applying hot-melt adhesive to backing strips of various types of seaming tape including tapes of the character disclosed in the Reinhard U.S. Pat. Nos. 2,552,114 and 2,647,850 and in the Burgess U.S. Pat. No. 3,400,038. Such a tape may comprise, for example, a backing strip and what may be termed a joining strip of loosely woven fabric that is bonded to the backing strip by a layer of suitable thermoplastic adhesive. The adhesive may be, for example, latex which is applied with a solvent or may be a hot-melt adhesive which is heated to fluid state for application.

In an ideal embodiment of such a seaming tape, the adhesive layer is substantially free from bubbles and is of uniform thickness with a smooth even surface. In addition, the loosely woven joining fabric is completely embedded in the adhesive layer with the fabric well below the surface of the adhesive.

One prior art method of applying an adhesive layer to a backing strip involves applying the adhesive to a roller which transfers the adhesive to the backing strip. Such a procedure does not provide adequate control of the thickness of the adhesive coating.

Another prior art method of fabricating such a seaming tape is to spread on the backing strip a layer of adhesive that is made fluent by the addition of a suitable solvent and to employ a blade to reduce the thickness of the deposited adhesive to the desired thickness. The loosely woven joining fabric may then be applied and forced into the previously deposited adhesive layer. One disadvantage of this fabrication procedure is that forcing the fabric into the applied adhesive spoils the smooth surface of the adhesive and makes the adhesive uneven or nonuniform in thickness. Another difficulty is that the adhesive-coated lamination must be passed through an extensive heating zone for evaporation of the solvent and this time consuming operation affords an opportunity for the fabric to become displaced.

Another prior art procedure is to extrude a ribbon of hot-melt adhesive onto the backing tape and then to apply the loosely woven fabric strip. One disadvantage of such a process is that the dimensioning of the extruder nozzle opening is critical and the rate of extrusion must be accurately synchronized with the travel of the backing strip. Here again, if the fabric strip is forced into the extruded ribbon of plastic, the fabric will spoil the surface finish and uniform thickness of the adhesive. Furthermore, there are numerous bubbles in the applied adhesive. Another difficulty is that first placing the adhesive ribbon on the backing strip and then later applying the fabric strip affords an opportunity for the plastic to harden to resist the penetration of the fabric.

It has been found that forming a number of longitudinal ribs in the plastic layer of such a seaming tape is advantageous when the time comes to use the tape to interconnect carpeting. Unfortunately, however, such ribs as produced by prior art methods are too easily separated from the seaming tape prior to the time of use.

The primary object of the present invention is to provide a fabrication procedure that avoids these various disadvantages and results in a product that is close to the above mentioned ideal seaming tape. A further object of the invention is to provide new tapes having special utility.

SUMMARY OF THE INVENTION

A suitable backing strip is moved longitudinally through an application zone with a loosely woven fabric joining strip superimposed thereon and with both strips in longitudinal tension. A heated metering barrier is placed across the two traveling strips at a spacing above the backing strip that is predetermined in accord with the desired thickness of the adhesive layer. A heated extruder head is positioned to extrude hot-melt adhesive onto the two traveling strips in front of the barrier with the direction of extrusion counter to the direction of travel of the two tapes. An ample body of the adhesive is maintained in front of the heated barrier by the extruder head and the two traveling tapes cause this body to be continuously rotated to continuously agitate and expose the adhesive of the body for release of entrained bubbles. The fact that the tensioned fabric strip is drawn through the rotating body of adhesive means that the adhesive layer is formed around the fabric strip instead of the fabric strip being forced into the adhesive layer from the outer surface thereof.

In one practice of the invention, the backing strip, the fabric strip and a third protective strip are fed from corresponding supply reels and the finished seaming tape is wound onto a power actuated takeup reel, the three strips being maintained under tension by frictionally retarding the three supply reels. The third strip is added to the laminated structure to protect the surface of the pressure-sensitive adhesive until the seaming tape is employed. The third strip may, for example, be made of wax paper or paper treated with silicone.

The laminated structure formed in the application zone passes around a pair of chilled rolls for the purpose of hardening the adhesive, the lower face of the laminated structure being against the first chilled roll and the upper face being in contact with the chilling surface of the second roll. An advantage of this arrangement is that the tensioning of the fabric strip pulls the fabric strip snug against the backing strip as the two strips pass around the periphery of the first chilled roll and the initial partial hardening of the adhesive effectively anchors the fabric strip while it is held against the backing strip.

The invention further teaches that the previously mentioned desirable longitudinal ribs may be formed in the adhesive layer of the tape in a superior manner at no extra cost by simply providing circumferential grooves in thee second chilled roll, the grooves being of the cross-sectional configuration desired for the ribs. The first chilled roll cools to hardened state an inner zone or stratum of the hot-melt adhesive and then the tensioning of the tape around the periphery of the second chilled roll with the adhesive coating of the tape in contact with the second chilled roll causes the grooves of the second chilled roll to form the desired longitudinal ribs in the adhesive layer. Since the ribs are interconnected by webs, i.e., by the initially chilled stratum of the adhesive layer, the ribs are integral with each other and therefore greatly resist separation from the adhesive layer.

In a modified practice of the invention the second chilled roll forms rows of projections in the adhesive layer instead of forming ribs. The rows of projections are interconnected by a web of the adhesive layer.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a simplified somewhat diagrammatic perspective view of the presently preferred apparatus for fabricating the carpet seaming tape;

FIG. 2 is a fragmentary perspective view of the seaming tape that has the pressure-sensitive adhesive, the protective strip being shown peeled away from the adhesive;

FIG. 3 is a side elevational view of the extruder head that applies the adhesive to form the adhesive layer, with a marginal portion of the side wall removed to reveal the concealed structure;

FIG. 4 is a front elevational view of the extruder head as seen along the line 4 — 4 of FIG. 3;

DESCRIPTION OF THE PREFERRED EMBODIMENT OF THE INVENTION

Figure 5:
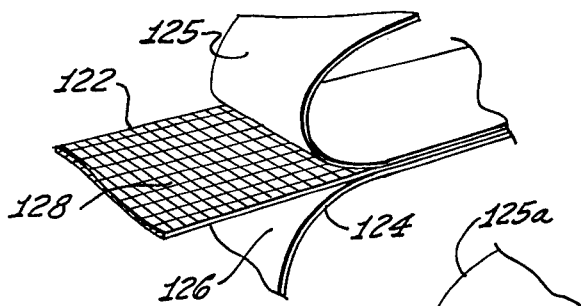
FIGS. 5 – 8 show different products of the fabrication method.

FIG. 1 shows the presently preferred embodiment of the invention for fabricating a seaming tape, generally designated 10, that is best illustrated in FIG. 2. FIG. 2 shows a crepe paper backing strip 12, a loosely woven fabric strip 14 super-imposed on the backing strip and embedded in a layer 12 of hot-melt pressure-sensitive adhesive that bonds the fabric strip to the backing strip. Finally a protective strip 16, which may be made of wax paper or paper treated with silicon to protect the surface of the pressure-sensitive adhesive. The protective strip may be readily peeled away from the adhesive layer 15 in the manner indicated in FIG. 2 in preparation for actual use of the seaming tape.

Referring to FIG. 1 a supply reel 18 for the backing strip 12 is rotatably mounted on a fixed shaft 20; a supply reel 22 for the fabric strip 14 is journalled on a fixed shaft 24; a supply reel 25 for the protective strip 16 is rotatably mounted on a fixed shaft 26 and a takeup reel 28 on which the finished seaming tape 10 is wound is journalled on a power-actuated shaft 30. To place the backing strip 12, the fabric strip 14 and the protective strip 16 under tension, the three supply reels 18, 22 and 25 are provided with corresponding friction brakes 32, 34 and 35 which resist rotation of the reels and thus cooperate with the takeup reel 28 to keep the three strips taut.

The backing strip 12 passes under idler rolls 36 and 38 and over a third idler roll 40 to enter an application zone on a horizontal support 42 that is best shown in FIG. 3. The fabric tape 14 passes under idler rolls 44 and 45 and over an upper idler roll 46 and is thus superimposed on the backing strip 12 in the application zone.

In the application zone a heated extruder head 48 applies the layer 15 of adhesive to the two traveling strips to embed the fabric strip and to bond the fabric strip to the backing strip. The thickness of the adhesive layer is determined by a heated metering barrier which in this instance is an integral part of the extrusion head. The two strips with the adhesive layer 15 thereon then pass around a first chilled roll 49 and a second chilled roll 50 in succession with the backing strip 12 in contact with the first chilled roll and with the adhesive 15 in contact with the second chilled roll. As the two strips with the adhesive layer 15 thereon pass around the first chilled roll 49, the tensioned protective strip 16 is superimposed on the adhesive layer.

Preferably the protective strip 16 is led around an idler roll 51 which is mounted on a pivoted arm 52. A coiled tension spring 53 acts on the pivoted arm 52 to cause the idler roll to press the protective strip 16 towards the underlying chilled roll 49 to force the protective strip into intimate contact with the adhesive layer 15.

From the second chilled roll 50 the finished tape 10 is directed to the takeup reel 28. Since the backing strip 12 and the fabric strip 14 are independently tensioned as they pass around the first chilled roll 49 and since the backing strip 12 lies against the first chilled roll, the fabric strip 14 is pulled snugly against the backing strip and is thus placed well below the surface of the adhesive layer 15. The adhesive layer progressively hardens as it passes over the first chilled roll and is completely hardened before it leaves the second chilled roll.

Actuating power is supplied by a motor 54 through a gear box 55 that has an output sheave 56. The output sheave 56 is connected by a belt 58 to a sheave 60 that is keyed to a countershaft 62. A sheave 64 on the countershaft 62 is connected by a belt 65 to a sheave 66 that is keyed to the shaft 30 for driving the takeup reel 28. Another sheave 68 on the countershaft 62 is connected by a belt 70 to a sheave 72 that is unitary with the chilled roll 50. The chilled roll 50 has teeth 74 that mesh with teeth 75 of the chilled roll 49 for actuation of the two chilled rolls in unison. A casing 76 houses a heated tank (not shown) to supply the heated adhesive and also houses motor driven pump means (not shown)

to feed heated hot-melt adhesive to the extruder head 48 by means of a pair of supply hoses 78.

In the presently preferred embodiment of the invention the extruder head 48 is of the construction shown in FIGS. 3 and 4. The body of the extruder head is made in two sections comprising two metal blocks 80 and 82, the extruder head being completed by a pair of side plates 84 that are anchored to the blocks 80 by suitable screws 85. The block 80 has a transverse bore 86 in which a suitable electrical heating element (not shown) is mounted to keep the extruder head at relatively high temperature thereby to heat the adhesive that flows through the extruder head. The block 80 is further provided with a larger transverse bore 88 which serves as a mixing chamber and which is formed with a slot 90 along its length to permit the heated adhesive to flow into a slot-like extrusion passage 92 that is formed by the two blocks jointly.

The block 82 is of stepped configuration as shown in FIG. 3 to cooperate with the block 80 to form the extrusion passage 92 and to narrow the outer end of the passage as shown. In the construction shown, the block 82 is connected to the block 80 by four adjustment screws 94 that pass through smooth bores in the block 82 and are threaded into corresponding bores in the block 80. To cooperate with the adjustment screws 94, the block 82 is provided with a pair of stop screws 95 that screw threadedly engage the block 82 and abut against the surface of the block 80. Tightening the four adjustment screws 94 rigidly fixes the block 82 relative to the block 80 with the adjustment screws under tension and with the stop screws under axial compression. Thus the position of the block 82 relative to the block 80 may be adjusted as desired to adjust the flow capacity of the extrusion passage 92. The two hose 78 for supplying the heated adhesive to the extruder head 48 are connected to corresponding fittings 96 that screw into the block 80 to place the two hose in communication with corresponding supply bores 98 that lead to the mixing chamber 88.

The extruder head 48 may be mounted in any suitable manner for adjustment relative to the horizontal support 42. In the construction shown, a cross rod 100 is supported at its opposite ends by a pair of fixed arms 102 and a collar 104 embraces the rod and is fixed relative thereto by a set screw 105. United with the collar 104 radially thereof is a screw 106 having a keyway 108 by means of which it is slidingly keyed in an aperture of a plate 110 that is welded to the block 80 of the extruder head. A pair of nuts 112 on the screw 106 straddle the plate 110 to grip the plate in an adjustable manner. It is apparent that the two nuts 112 may be loosened to permit axial shift of the screw 106 to raise or lower the extruder head.

As indicated by the arrows in FIG. 3 the extruder head 48 discharges the adhesive onto the two traveling strips in the direction that is opposite to the longitudinal travel of the two strips and the continuous extrusion of the adhesive forms a continuously maintained body 114 of the plastic in front of the extruder head. This body of adhesive is confined to the width of the extruder passage 92 by a pair of wing plates 115 that are anchored to the extruder head by suitable screws 116. The travel of the two strips under the body of adhesive 114 causes the body of adhesive to continuously rotate in the manner indicated by the arrows and thus continuously exposes portions of the extruded adhesive to the atmosphere for the release of bubbles from the adhesive.

A suitable heated metering barrier is provided in spaced relation to the horizontal support 42 and the traveling strips to determine the thickness of the adhesive coating that is applied to the two traveling strips. Any suitable heated barrier may be employed for this purpose. A feature of the present embodiment is that a portion of the extruder head 48 itself serves as the heated metering barrier. As shown in FIG. 3, a transverse edge 118 of the extruder head is formed by two external surfaces of the extruder head that are at an obtuse angle relative to each other and this edge meters the amount of adhesive that is permitted to continue with the two strips.

To carry out the desired metering function, the barrier must be heated and must be in heat transferring contact with the adhesive as the adhesive approaches the metering edge 118. In FIG. 3 the inclined undersurface 120 of the extruder head serves to keep the adhesive heated to fluency as the adhesive approaches the metering edge.

In the operation of the apparatus just described, the hot-melt adhesive is a pressure-sensitive adhesive that requires the protective strip 16. The advantage of employing a pressure-sensitive adhesive is that it is not necessary to heat the adhesive layer on the seaming tape to make the adhesive layer sufficiently tacky for adherence of the carpeting thereto. In many instances where carpeting is installed in a house or building that is under construction, no convenient source of electricity is available to energize a sadiron for heating a conventional hot-melt adhesive.

If the extruder head 48 is supplied with conventional hot-melt adhesive, the protective strip 16 is unnecessary and therefore the supply reel 24 for the protective strip stands idle. The operation of the apparatus is the same as described above except for the ommission of the protective strip. A suitable thermoplastic hot-melt adhesive is LHM adhesive sold by Stein, Hall and Co., 605 Third Avenue, New York, New York 10016.

The described fabrication method is flexible and may be used to apply hot-melt adhesive to backing strips of a wide variety of laminated tapes. By way of example, FIGS. 5 – 8 show novel tapes that may be produced efficiently and economically by the apparatus shown in FIGS. 1 – 4.

In FIG. 5, the laminated product comprises a ribbon 122 of hot-melt pressure-sensitive adhesive deposited on a backing strip 124 and covered by a releasable protective strip 125. The surface 126 of the backing strip 124 is also releasable from the adhesive and like the protective strip 125 may be treated with silicone for this purpose. The adhesive ribbon 122 is reinforced by embedded fabric 128 which, in this instance, is in the form of ⅛ inch mesh fiber glass screen material.

I have found that a ribbon of pressure-sensitive adhesive that has a viscosity of 20,000 centipoises when melted and that is solidified at temperatures below 150° F. has outstanding advantages over a ribbon of conventional pressure-sensitive adhesive that incorporates a solvent. In the first place, a hot-melt pressure-sensitive adhesive of this character is tackier and has much more bonding strength than the solvent type of adhesive. In the second place, the hot-melt pressure-sensitive adhesive does not deteriorate with the passage of time, whereas a solvent type adhesive gradually dries out and eventually looses its bonding strength. In the third place, it is difficult to release an applied solvent type adhesive but a hot-melt adhesive may be readily released by the application of heat.

A suitable hot-melt pressure-sensitive adhesive for this purpose is LHM-904 adhesive available from Stein, Hall and Co., 605 Third Avenue, New York, New York 10016.

The screen material 128 greatly strengthens the resistance of the adhesive ribbon to shear forces and tension forces but does not lessen the capability of the ribbon to bond two opposed surfaces together. For example, if the adhesive ribbon 122 is separated from the two strips 124 and 125 and is then sandwiched between two panels in intimate contact with the panels, the adhesive ribbon will directly bond the two panels together at each of the ⅛ inch openings of the screen material. The hot-melt pressure-sensitive ribbon has such high bonding strength that it may be used to bond panels to a wall surface and may even be used to hang relatively heavy pictures or mirrors.

Figure 6:
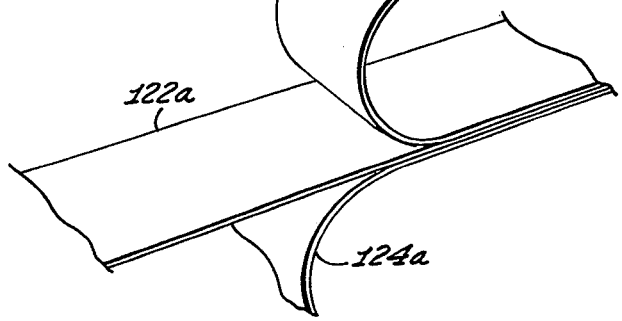

The product in FIG. 6 is similar to the product in FIG. 5, as indicated by corresponding reference numerals. The difference is that the adhesive ribbon 122a in FIG. 6 does not incorporate a fabric reinforcement.

Figure 7:
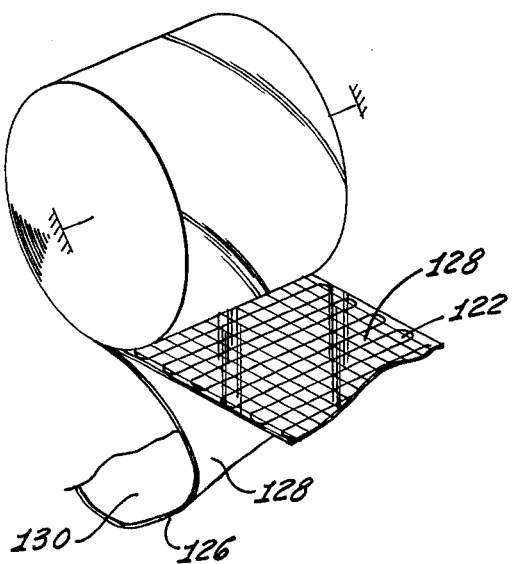

FIG. 7 shows a roll of laminated tape which has only two layers, namely, a backing strip 126 and a previously described ribbon 122 of reinforced hot-melt pressure-sensitive adhesive. In this embodiment, both the front face 128 and the back face 130 of the backing strip 126 are treated with silicone to prevent adherence to the adhesive ribbon 122. The laminated tape shown in FIG. 7 has the same capabilities as the laminated tape shown in FIG. 5, but is simpler and less expensive because it has only two laminations instead of three.

Figure 8:
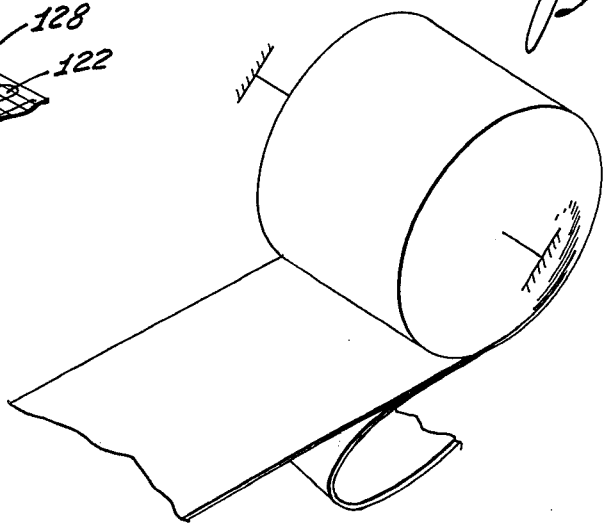

FIG. 8 shows a roll of two-layer tape which differs from the tape shown in FIG. 7 in the elimination of the fabric reinforcement 128. In other words, the tape shown in FIG. 8 differs from the tape shown in FIG. 7 in the substitution of the adhesive ribbon 122a of FIG. 6 for the reinforced ribbon 122.

Figure 9:
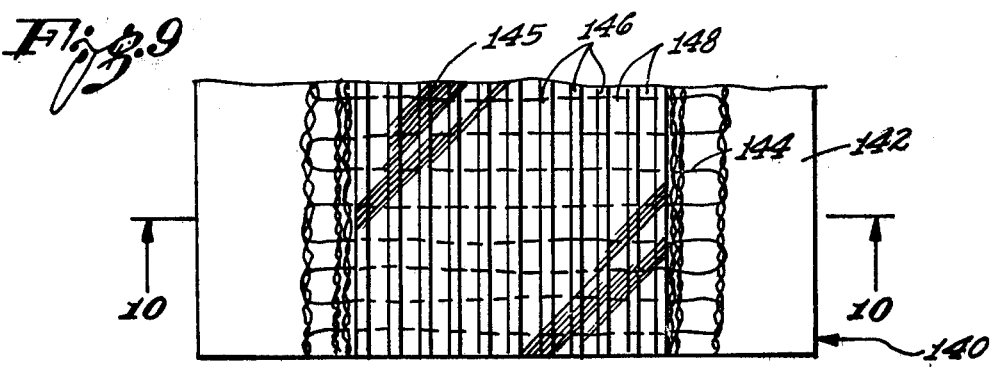
FIG. 9 is a fragmentary plan view of a tape with longitudinal grooves formed in the hot-melt adhesive layer.
Figure 10:
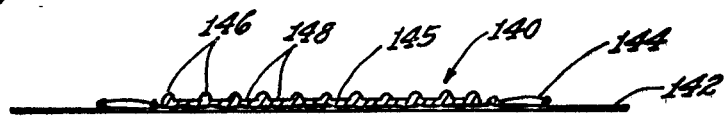
FIG. 10 is a transverse section along the line 10 — 10 of FIG. 9.

FIGS. 9 and 10 show the structure of a seaming tape, generally designated 140, which is similar to the seaming tape shown in FIG. 2 in that it comprises a paper backing strip 142, a strip 144 of loosely woven fabric and a layer 145 of hot-melt adhesive which embeds a central longitudinal portion of the loosely woven fabric and bonds the loosely woven fabric to the backing strip. The tape 140 differs from the tape shown in FIG. 2, however, in that the hot-melt coating 145 is formed with longitudinal ribs 146, the ribs being integral with and interconnected by a web 148 of the adhesive layer.

Tapes of this general character have been produced heretofore by two different methods. One of these methods comprises the steps: first, coating the paper backing strip with a thin layer of vinyl acetate; second, applying the loosely woven fabric to the paper backing with pressure to bond the loosely woven fabric to the paper backing by the vinyl acetate; and third, extruding discrete strips of hot-melt adhesive onto the loosely woven fabric to form the desired ribs of the hot-melt adhesive. The resultant seaming tape is not entirely satisfactory because the individual strips or ribs of the hot-melt adhesive being separated from each other may be too easily detached and commonly do become detached in the course of the handling of the seaming tape prior to the time of use of the seaming tape.

The second prior method of fabricating a ribbed seaming tape comprises the steps of: first, weaving the loosely woven fabric progressively and simultaneously sewing the loosely woven fabric to the paper backing; and second, extruding discrete strips of hot-melt adhesive onto the loosely woven fabric to provide the desired ribs. Here again the discrete ribs of hot-melt adhesive are only lightly attached to the loosely woven fabric and the paper backing and may be too easily detached.

Another disadvantage is that speed at which the seaming tape can be fabricated is limited to the rate that the fabric can be woven. A further disadvantage is that the stitching of the loosely woven fabric to the paper backing results in needle holes through the paper backing and subsequently at the time of use the heating of the hot-melt ribs to make them adhesive results in some of the hot-melt adhesive leading through needle holes in the paper backing. The hot-melt that leaks through causes the paper backing to adhere to the carpet backing and when the carpet is subsequently stretched after the carpet edges are interconnected by the seaming tape, the movement of the seaming tape by the carpet during the stretching of the carpet causes the carpet backing to be dragged along by the seaming tape with undesirable results.

In contrast to these two prior art seaming tapes, the ribs 146 of the seaming tape shown in FIGS. 9 and 10 are integral with the web 148 of the hot-melt adhesive and, therefore, are integral parts of the whole adhesive layer to eliminate any possibility whatsoever for the individual ribs to become detached.

Figure 12:
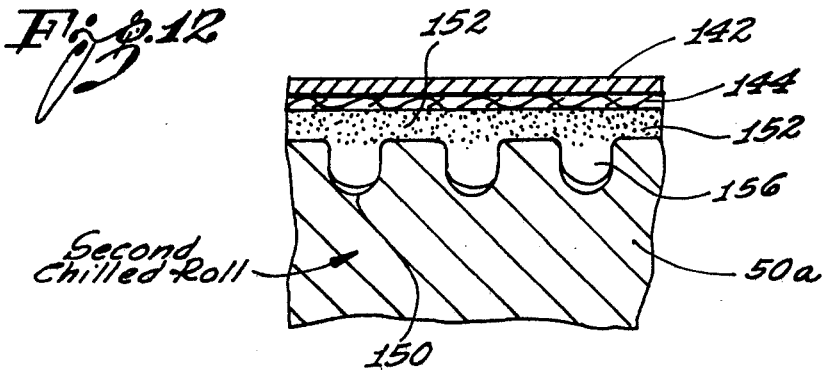
FIG. 12 is a similar view showing how passing the tape around a second chilled roll that is provided with circumferential grooves results in the formation of the longitudinal ribs in the hot-melt adhesive.

A feature of the previously described apparatus shown in FIG. 1 is that only a simple modification of the apparatus is required to produce the ribbed tape that is shown in FIGS. 9 and 10. The modification consists solely of providing circumferential grooves in the second chilled roll 50 with the grooves spaced and shaped in cross section to form the required ribs 146 in the hot-melt adhesive layer of the tape in response to the previously mentioned tensioning of the tape across the second chilled roll. FIG. 12 shows how such a second chilled roll 50a may be formed with circumferential grooves 150 of appropriate cross section and spacing.

Figure 11:
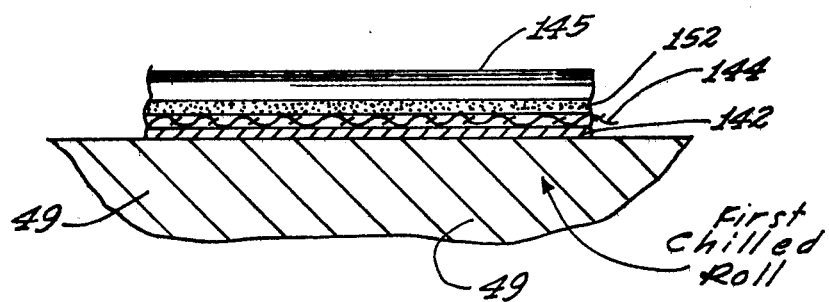
FIG. 11 is a diagrammatic view showing how passing the tape around a first chilled roll hardens an inner zone of the hot-melt adhesive coating of the tape.

An unexpected advantage of using the modified apparatus to produce a ribbed seaming tape is that the first chilled roll 49 which in contact with the backing strip of the tensioned tape serves to cool and harden an inner zone or stratum of the hot-melt adhesive that is contiguous to the backing strip. FIG. 11 shows diagrammatically how the first chilled roll 49 hardens an inner stratum 152 of the hot-melt adhesive layer 145. It is understood, of course, that the traveling tape is maintained under sufficient tension to keep the backing strip 142 of the tape in intimate contact with the first chilled roll 49 and to cause the softened portion of the hot-melt adhesive layer 145 to penetrate the grooves 150 of the second cooling roll 50a. It is to be noted that the prehardened stratum 152 of the tape resists deformation by the second chilled roll 50a and thus limits the extent to which the softened portion of the hot-melt adhesive enters the circumferential grooves 150.

Figure 13:
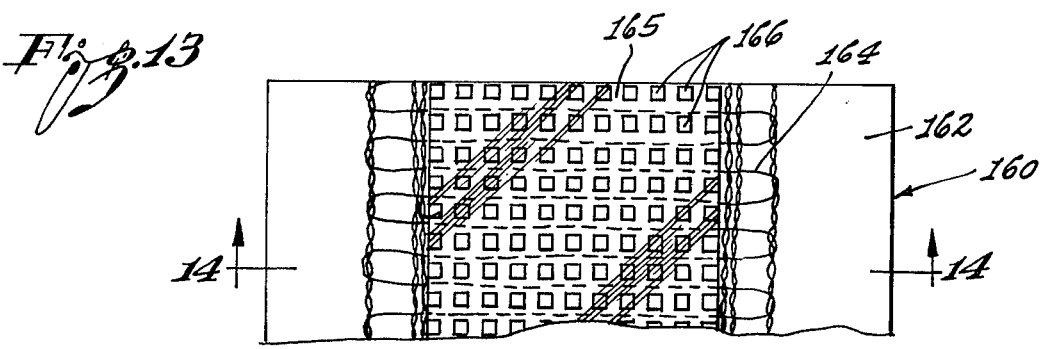
FIG. 13 is a view similar to FIG. 9 showing a tape with rows of projections formed in the adhesive layer of the tape.
Figure 14:
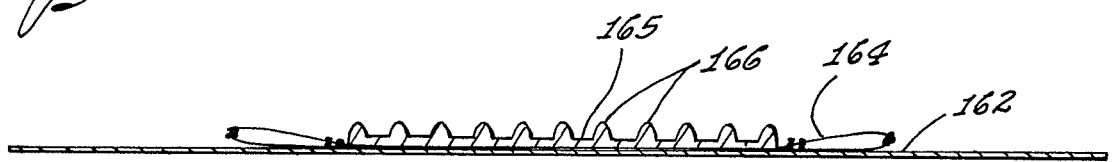
FIG. 14 is a transverse section along the line 14 — 14 of FIG. 13.

FIGS. 13 and 14 show the structure of a seaming tape, generally designated 160, which is similar to the seaming tape shown in FIGS. 9 and 10 in that it comprises a paper backing 162, a strip 164 of loosely woven fabric and a layer 165 of hot-melt adhesive which embeds a central longitudinal portion of the loosely woven fabric and bonds the loosely woven fabric to the backing strip. The tape 160 differs from the tape 140 shown in FIGS. 9 and 10, however, in that the hot-melt coating 165 is formed with numerous projections 166. Preferably the numerous projections are arranged in horizontal and transverse rows as may be seen in FIG. 13.

Figure 15:
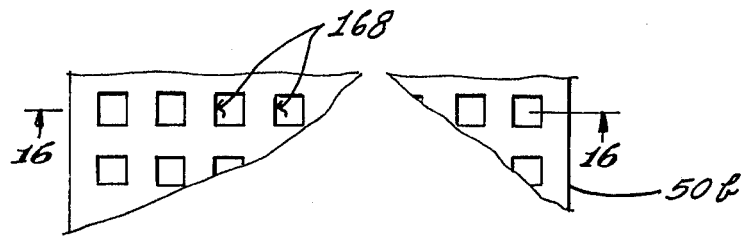
FIG. 15 is a fragmentary plan view of the surface of a chilled roll that forms the projections in the adhesive layer.
Figure 16:
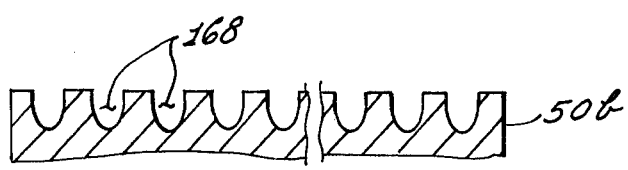
FIG. 16 is a section along the line 16 — 16 of FIG. 15.

The projections 166 of the hot-melt adhesive layer are produced in the same general manner as the ribs 146 of the previously described tape 140. For this purpose, the second of the two previously described chilled rolls is modified in the manner shown in FIGS. 15 and 16. In FIGS. 15 and 16 the peripheral surface of a second chilled roll 50b of the two chilled rolls is formed with numerous recesses 168 of the configuration of the desired projections, the recesses being arranged in both rows that extend circumferentially of the roll and rows that extend longitudinally of the roll.

Here again the first chilled roll which contacts the backing strip of the tension tape serves to cool and harden an inner zone or stratum of the hot-melt adhesive that is contiguous to the backing strip. Thus the first chilled roll forms an inner zone or stratum corresponding to the inner zone or stratum 152 in previously described FIG. 11. When the tape with such a prehardened stratum is passed under tension over the second chilled roll 50 with the adhesive layer 165 of the tape firmly pulled against the peripheral surface of the second chilled roll by tensioning of the tape, the molten portion of the hot-melt adhesive layer penetrates the recesses 168 of the roll in the manner indicated in FIG. 17 to cause the molten portion of the hot-melt adhesive layer to penetrate the recesses with resultant formation of the projections 166.

Figure 17:
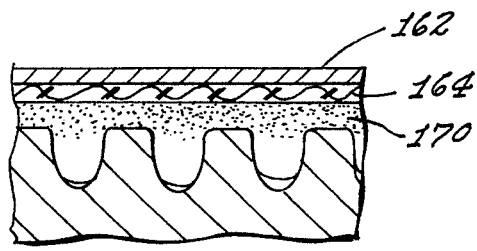
FIG. 17 is a view similar to FIG. 16 showing how passing the tape around the chilled roll shown in FIGS. 15 and 16 results in the formation of the numerous projections in the adhesive layer of the tape.

It is to be noted in FIG. 17 that the prehardened stratum 170 of the adhesive layer that has been created by the first chilled roll now resists deformation by the second chilled roll 50b to limit the extent to which the molten portion of the hot-melt adhesive enters the peripheral recesses 168.

My description in specific detail of the presently preferred embodiments of the invention will suggest various changes, substitutions and other departures from my disclosure within the spirit and scope of the appended claims.

I claim:

1. In a method of fabricating a tape wherein a heated hot-melt adhesive is applied to a traveling backing strip to form a layer of the adhesive thereon,
   the improvement to form projections in the adhesive layer, including the steps of
   partially cooling the adhesive layer through the backing strip to form a hardened stratum of the adhesive coating contiguous to the backing strip;
   drawing the tape around the outer circumference of a roll having recesses in the outer circumferential surface thereof with the adhesive coating against the periphery of the roll at the recesses and while the adhesive is in a heated soft state, and
   maintaining the tape under tension to force the soft adhesive into the recesses of the roll while the hardened stratum of the adhesive coating resists deformation by the roll and thereby limits the extent to which the heated soft adhesive enters the recesses of the roll,
   whereby hardened projections are formed in the adhesive coating which correspond to the recesses in the roll with the projections interconnected to each other and to the backing strip through the hardened stratum of the adhesive coating in the area contiguous to the backing strip.

2. An improvement as set forth in claim 1 in which the prior step is carried out by moving the tape under tension around at least a portion of the outer circumference of a chilled precooling roll.

3. An improvement as set forth in claim 2 in which the recessed roll is a chilled roll.

* * * * *